(12) United States Patent
Burckhardt et al.

(10) Patent No.: US 8,433,954 B2
(45) Date of Patent: Apr. 30, 2013

(54) TESTING COMPONENTS FOR THREAD SAFETY

(75) Inventors: Sebastian C. Burckhardt, Sammamish, WA (US); Christopher W. Dern, Kirkland, WA (US); Madanlal S. Musuvathi, Redmond, WA (US); Roy P. Tan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 12/763,230

(22) Filed: Apr. 20, 2010

(65) Prior Publication Data
US 2011/0258490 A1 Oct. 20, 2011

(51) Int. Cl.
*G06F 11/00* (2006.01)

(52) U.S. Cl.
USPC .......................................... 714/38.1; 714/31

(58) Field of Classification Search ................... 714/38.1
See application file for complete search history.

(56) References Cited

U.S. PATENT DOCUMENTS

| | | | |
|---|---|---|---|
| 6,826,752 B1 | 11/2004 | Thornley et al. | |
| 7,114,164 B2 * | 9/2006 | Smith et al. | 719/318 |
| 7,464,158 B2 * | 12/2008 | Albornoz | 709/224 |
| 7,549,150 B2 | 6/2009 | Yu | |
| 7,650,539 B2 * | 1/2010 | Carrie et al. | 714/47.1 |
| 7,984,332 B2 * | 7/2011 | Yang et al. | 714/32 |
| 8,166,257 B1 * | 4/2012 | Holl et al. | 711/154 |
| 8,185,874 B2 * | 5/2012 | Ball et al. | 717/124 |
| 2004/0154020 A1 | 8/2004 | Chen et al. | |
| 2004/0250189 A1 * | 12/2004 | Smith et al. | 714/741 |
| 2005/0086500 A1 * | 4/2005 | Albornoz | 713/188 |
| 2007/0006040 A1 * | 1/2007 | Carrie et al. | 714/38 |
| 2008/0086296 A1 | 4/2008 | Kahlon | |
| 2009/0037197 A1 | 2/2009 | McCrae et al. | |
| 2009/0049545 A1 | 2/2009 | Nagpal et al. | |
| 2009/0178044 A1 * | 7/2009 | Musuvathi et al. | 718/102 |
| 2009/0183143 A1 * | 7/2009 | Li et al. | 717/126 |
| 2009/0222825 A1 | 9/2009 | Upadhyaya et al. | |
| 2010/0205484 A1 * | 8/2010 | Dragicevic et al. | 714/37 |
| 2011/0167412 A1 * | 7/2011 | Kahlon et al. | 717/128 |

OTHER PUBLICATIONS

Venners, Bill, "Designing for Thread Safety," version retrieved at <<http://www.artima.com/designtechniques/threadsafety.html>>, JavaWorld, Jul. 8, 1998, 3 pages.

(Continued)

*Primary Examiner* — Kamini Patel
(74) *Attorney, Agent, or Firm* — Tracy S Powell; Powell IP Law, PLLC

(57) ABSTRACT

A checking system is described for determining whether a component is thread safe in the course of interacting with two or threads in a client environment. The checking system uses a manual, automatic, or semi-automatic technique to generate a test. The checking system then defines a set of coarse-grained observations for the test, in which the component is assumed to exhibit linearizability when interacting with threads. The set of coarse-grained observations may include both complete and "stuck" histories. The checking system then generates a set of fine-grained observations for the tests; here, the checking system makes no assumptions as to the linearizability of the component. The checking system identifies potential linearizability errors as those entries in the set of fine-grained observations that have no counterpart entries in the set of coarse-grained observations. The checking system may rely on a stateless model checking module to perform its functions.

20 Claims, 5 Drawing Sheets

OTHER PUBLICATIONS

Dechev, et al., "Semantically Enhanced Containers for Concurrent Real-Time Systems," retrieved at <<http://www2.research.att.com/~bs/sec09.pdf>>, Proceedings of the 2009 16th Annual IEEE International Conference and Workshop on the Engineering of Computer Based Systems, Apr. 2009, 10 pages.

Rodriguez, et al., "Extending JML for Modular Specification and Verification of Multi-threaded Programs," retrievable at <<http://www.cse.ucsc.edu/~cormac/papers/ecoop05.pdf>>, European Conference on Object-oriented programming, vol. 3586, No. 19, Jul. 25, 2005, pp. 551-576.

Jacobs, et al., "Safe Fine-Grained Locking for Aggregate Objects," retrieved at <<http://www.cs.kuleuven.be/publicaties/rapporten/cw/CW444.pdf>>, Reports No. CW444, Department of Computer Science, K.U. Leuven, Apr. 2006, 12 pages.

"Checking DLLs for Thread Safety," retrievable at <<software.intel.com/file/6322>>, retrieved on Feb. 19, 2010, 3 pages.

Abadi, et al., "The existence of Refinement Mappings," version retrieved at <<http://research.microsoft.com/en-us/um/people/lamport/pubs/abadi-existence.pdf>>, Technical Report No. SRC-RR-29, Systems Research Center of Digital Equipment Corporation in Palo Alto, California, 1988, 48 pages.

Burckhardt, et al., "CheckFence: Checking Consistency of Concurrent Data Types on Relaxed Memory Models," version retrieved at <<http://acm.org >>, ACM SIGPLAN Notices, vol. 42, Issue 6, Jun. 2007, Proceedings of the 2007 PLDI Conference, pp. 12-21.

Colvin, et al., "Formal Verification of a Lazy Concurrent List-Based Set Algorithm," version retrieved at <<http://citeseerx.ist.psu.edu/viewdoc/download?doi=10.1.1.91.7522&rep=rep1&type=pdf>>, Computer-Aided Verification (CAV), LNCS 4144, Springer, 2006, pp. 14 pages.

Coons, et al., "Gambit: Effective Unit Testing of Concurrency Libraries," version retrieved at <<http://acm.org>>, 15th ACM SIGPLAN Annual Symposium on Principles and Practice of Parallel Programming, 2010, pp. 15-24.

Doherty, et al., "DCAS is not a Silver Bullet for Nonblocking Algorithm Design," version retrieved at <<http://acm.org>>, Symposium on Parallel Algorithms and Architectures (SPAA), 2004, pp. 216-224.

Elmas, et al., "A Calculus of Atomic Actions," version retrieved at <<http://acm.org>>, Proceedings of the 36th Annual ACM SIGPLAN-SIGACT Symposium on Principles of Programming Languages, 2009, pp. 2-15.

Elmas, et al., "VYRD: Driving Runtime Refinement Checking with Model Checkers," version retrieved at <<http://react.cs.uni-sb.de/rv2005/proceedings/3.pdf>>, Electronic Notes in Theoretical Computer Science (ENTCS, 2006, 14 pages.

Elmas, et al., "VYRD: Verifying Concurrent Programs by Runtime Refinement-Violation Detection," version retrieved at <<http://acm.org>>, Programming Language Design and Implementation (PLDI), 2005, pp. 27-37.

Farzan, et al., "Monitoring Atomicity in Concurrent Programs," version retrieved at <<http://www.cs.uiuc.edu/homes/madhu/atomicity.pdf>>, Computer-Aided Verification (CAV), LNCS 5123, Springer, 2008, 18 pages.

Flanagan, et al., "Fast Track: Efficient and Precise Dynamic Race Detection," version retrieved at <<http://acm.org>>, Proceedings of the 2009 ACM SIGPLAN Conference on Programming Language Design and Implementation, 2009, pp. 121-133.

Flanagan, et al., "Velodrome: A Sound and Complete Dynamic Atomicity Checker for Multithreaded Programs," version retrieved at <<http://acm.org>>, Proceedings of the 2008 ACM SIGPLAN Conference on Programming Language Design and Implementation, pp. 293-303.

Fraser, Keir, "Practical Lock-Freedom," PhD thesis, University of Cambridge, Technical Report No. UCAM-CL-TR-579, 2004, 116 pages.

Fraser, et al., "Concurrent Programming without Locks," version retrieved at <<http://acm.org>>, ACM Transactions on Computer Systems, vol. 25, No. 2, Article 5, 2007, 61 pages.

Herlihy, et al., "Linearizability: a Correctness Condition for Concurrent Objects," version retrieved at <<http://acm.org>>, ACM Transactions on Computer Systems, vol. 12, No. 3, 1990, pp. 463-492.

Lamport, Leslie, "How to make a Multiprocessor Computer that Correctly Executes Multiprocess Programs," version retrieved at <<http://research.microsoft.com/en-us/um/people/lamport/pubs/multi.pdf >>, IEEE Transactions on Computers, vol. c-28, No. 9, 1979, 2 pages.

Marino, et al., "LiteRace: Effective Sampling for Lightweight Data-race Detection," version retrieved at <<http://acm.org>>, Proceedings of the 2009 ACM SIGPLAN Conference on Programming Language Design and Implementation, 2009, pp. 134-143.

Michael, et al., "Correction of a Memory Management Method for Lock-Free Data Structures," version retrieved at <<http://www.cs.rochester.edu/~scott/papers/1995_TR599.pdf>>, Technical Report TR599, University of Rochester, 1995, 7 pages.

"Parallel Extensions to the .NET FX CTP," retrieved at << http://blogs.msdn.com/somasegar/archive/2007/11/29/parallel-extensions-to-the-net-fx-ctp.aspx>>, Somasegar's WebLog, Nov. 2007, Microsoft Corporation, Redmond, WA, accessed on Apr. 19, 2010, 14 pages.

"NET Framework 4 Data Structures for Parallel Programming," retrieved at << http://msdn.microsoft.com/en-us/library/dd460718.aspx>>, Nov. 2009, Microsoft Corporation, Redmond, WA, accessed on Apr. 19, 2010, 3 pages.

Musuvathi, et al., "Fair Stateless Model Checking," version retrieved at <<http://acm.org>>, Proceedings of the 2008 ACM SIGPLAN Conference on Programming Language Design and Implementation, 2008, pp. 362-371.

Musuvathi, et al., "Finding and Reproducing Heisenbugs in Concurrent Programs," version retrieved at <<http://www.usenix.org/events/osdi08/tech/full_papers/musuvathi/musuvathi.pdf>>, 8th USENIX Symposium on Operating Systems Design and Implementation, 2008, 14 pages.

Papadimitriou, Christos H., "The Serializability of Concurrent Database Updates," version retrieved at <<http://acm.org>>, Journal of the ACM, 4(26), Oct. 1979, 631-653.

Savage, et al., "Eraser: A Dynamic Data Race Detector for Multithreaded Programs," version retrieved at <<http://acm.org >>, Proceedings of the 16th ACM Symposium on Operating System Principles, 15(4), 1997, pp. 391-411.

Vafeiadis, Viktor, "Shape-Value Abstraction for Verifying Linearizability," version retrieved at <<http://research.microsoft.com/en-us/um/people/viktorva/papers/vmcai09-shapevalue.pdf>>, Proceedings of the 10th International Conference on Verification, Model Checking, and Abstract Interpretation, 2009, 14 pages.

Vafeiadis, et al., "Proving Correctness of Highly-Concurrent Linearisable Objects," version retrieved at <<http://acm.org >>, Proceedings of the eleventh ACM SIGPLAN Symposium on Principles and Practice of Parallel Programming, 2006, pp. 129-136.

Vechev, et al., "Experience with Model Checking Linearizability," version retrieved at <<http://www.research.ibm.com/people/e/eyahav/papers/spin09.pdf>>, SPIN, 2009, 18 pages.

Musuvathi, et al., "CHESS: A Systematic Testing Tool for Concurrent Software," version retrieved at <<http://research.microsoft.com/pubs/70509/tr-2007-149.pdf>>, Microsoft Research Technical Report No. MSR-TR-2007-149, Microsoft Corporation, Redmond, WA, 2007, 16 pages.

CHESS homepage, retrieved at <<http://research.microsoft.com/en-us/projects/chess/>>, Microsoft Corporation, Redmond, WA, retrieved on Apr. 19, 2010, 2 pages.

* cited by examiner

| Thread A | Thread B |
|---|---|
| Add(200) | Take() |
| Add(400) | TryTake () |

EXAMPLE OF A 2X2 TEST
302

```
<observationset>
    <observationsection>
308 {   <thread id="A">1 2</thread>
        <thread id="B">3 4</thread>
        <op id="1" name="Add">value="200"</op>
310 {   <op id="2" name="Add">value="400"</op>
        <op id="3" name="Take">result="200"</op>
        <op id="4" name="TryTake">result="Fail"</op>
312 {   <history>1[ ]1 3[ ]3 4[ ]4 2[ ]2</history>
    </observationsection>
    <observationsection>
        <thread id="A">1 2</thread>
        <thread id="B">3 4</thread>
        <op id="1" name="Add">value="200"</op>
        <op id="2" name="Add">value="400"</op>
        <op id="3" name="Take">result="200"</op>
        <op id="4" name="TryTake">result="400"</op>
        <history>1[ ]1 2[ ]2 3[ ]3 4[ ]4</history>
        <history>1[ ]1 3[ ]3 2[ ]2 4[ ]4</history>
    </observationsection>
    <observationsection>
        <thread id="A"></thread>
        <thread id="B">1B</thread>
        <op id="1" name="Take" />
        <history>1[ .</history>
    </observationsection>
</observationset>
```

306 { (braces enclosing first observationsection)

COARSE-
GRAINED
OBSERVATIONS
304

```
<thread id="A">1 2</thread>
<thread id="B">3 4</thread>
<op id="1" name="Add">value="200"</op>
<op id="2" name="Add">value="400"</op>
<op id="3" name="Take">result="200"</op>
<op id="4" name="TryTake">result="Fail"</op>
<history>1[ 3[ ]1 2[ ]3 ]2 4[ ]4</history>
```

NON-MATCHING
(ANOMALOUS)
FINE-GRAINED
OBSERVATION
314

FIG. 3

TESTING COMPONENTS FOR THREAD SAFETY

BACKGROUND

In a multi-threaded environment, a program may include two or more threads that interact with a software component in a concurrent manner. A developer will attempt to design such a component so that it exhibits correct behavior in this environment. Deviations from intended behavior often yield erroneous results, such as an indication that a queue is empty when, in fact, it is not. On the other hand, a component which appears to behave in a desired manner is said to be "thread safe."

The industry has proposed different ways of defining and testing thread safety. These techniques, however, have one or more drawbacks. One such shortcoming is inaccurate and/or imprecise results. For example, some atomicity checking techniques suffer from false alarms, reporting concurrency-related errors even on correct implementations. Other techniques (such as data-race freedom techniques) may provide a restrictive definition of thread safety that fails to identify legitimate concurrency-related errors.

Still other techniques are complex and burdensome. For example, some techniques rely on the user to manually annotate the source code associated with a component by identifying linearization points within the code. A component is considered linearizable if each operation appears to take effect atomically at these manually-defined linearization points, where each such point is temporally located between the time of operation call and the time of operation return. However, this approach is not fully satisfactory. First, the user may provide incorrect annotations, which may lead to false alarms during the test. Second, the user may not be effective in using this approach if he or she does not possess detailed knowledge of the source code of the component. The user may also be at a disadvantage if he or she does not have an adequate understanding of the theory on which this testing approach is based. Third, the location of the linearization points may depend on dynamic conditions that are not statically known; in these circumstances, the user may need to resort to nontrivial annotation techniques to identify the locations of linearization points.

For at least these representative reasons, it is considered a difficult task to build and test components that behave in a manner that is considered thread safe. Indeed, there is even lack of consensus at to what thread safety may entail in different environments.

SUMMARY

A safety checking system is described for checking the safety of a component which interacts with two or more threads. In one illustrative implementation, the safety checking system operates by first providing at least one test, e.g., using a manual technique, a random test-generating technique, or some combination thereof. The safety checking system then generates and records a set of coarse-grained interleaving observations for the test. Each coarse-grained observation is generated based on the constraining assumption that there is no concurrency within the component as the component interacts with the two or more threads. The safety checking system then generates and records a set of fine-grained interleaving observations for the test. Each fine-grained observation is generated without any constraints on the concurrency-related behavior of the component. Finally, the safety-checking system determines whether each of the fine-grained observations has a counterpart entry (e.g., a "witness") in the set of coarse-grained observations, where the set of coarse-grained observations serve as a-priori examples of proper component behavior. The safety-checking system identifies unmatched fine-grained observations as possible linearizability errors affecting the component.

The safety checking system offers various benefits. First, the safety checking system provides an automated or semi-automated method for generating and validating tests, therefore reducing the burden on a user. Second, the safety checking system provides an intuitive and user-friendly interface; this allows users with even minimal experience in testing to effectively use this tool. For example, the user is expected to understand neither the underlying complexity of the component being tested nor the theoretical background of the testing approach. Third, the safety checking system provides conclusive results in certain scenarios. For example, if the safety checking system detects a linearizability anomaly that affects a component, the user can be assured that this anomaly does, in fact, represent a deviation from the principles of linearizability for the component. (That deviation may or may not, however, be regarded as a formal error by the developer of the program, e.g., depending on the intent of the developer in designing the component.)

According to another illustrative aspect, each observation in the set of coarse-grained observations comprises a history that includes a sequence of operations. Each operation is associated with a respective call and return. A subset of observations in the set of coarse-grained observations may include complete histories; each complete history corresponds to a sequence of observations that contains no pending operation that includes a call without a corresponding return. Another subset of observations in the set of coarse-grained observations may include "stuck" histories; each stuck history corresponds to a sequence of operations where at least one operation includes a pending call without a corresponding return. The safety checking system is thereby able to provide a more robust investigation of behavior by comparing fine-grained stuck histories with coarse-grained stuck histories (which are considered a-priori proper).

According to another illustrative aspect, the safety checking system may use a stateless model checker module to populate entries in the set of coarse-grained observations and the set of fine-grained observations.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows an example of coarse-grained and fine-grained observations generated by the safety checking system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative safety checking system for determining whether a component exhibits the property of linearizability (described below), and is therefore regarded as thread safe. Section B describes illustrative methods which explain the operation of the safety checking system. Section C describes illustrative processing functionality that can be used to implement any aspect of the features described in Sections A and B.

Figure 5:
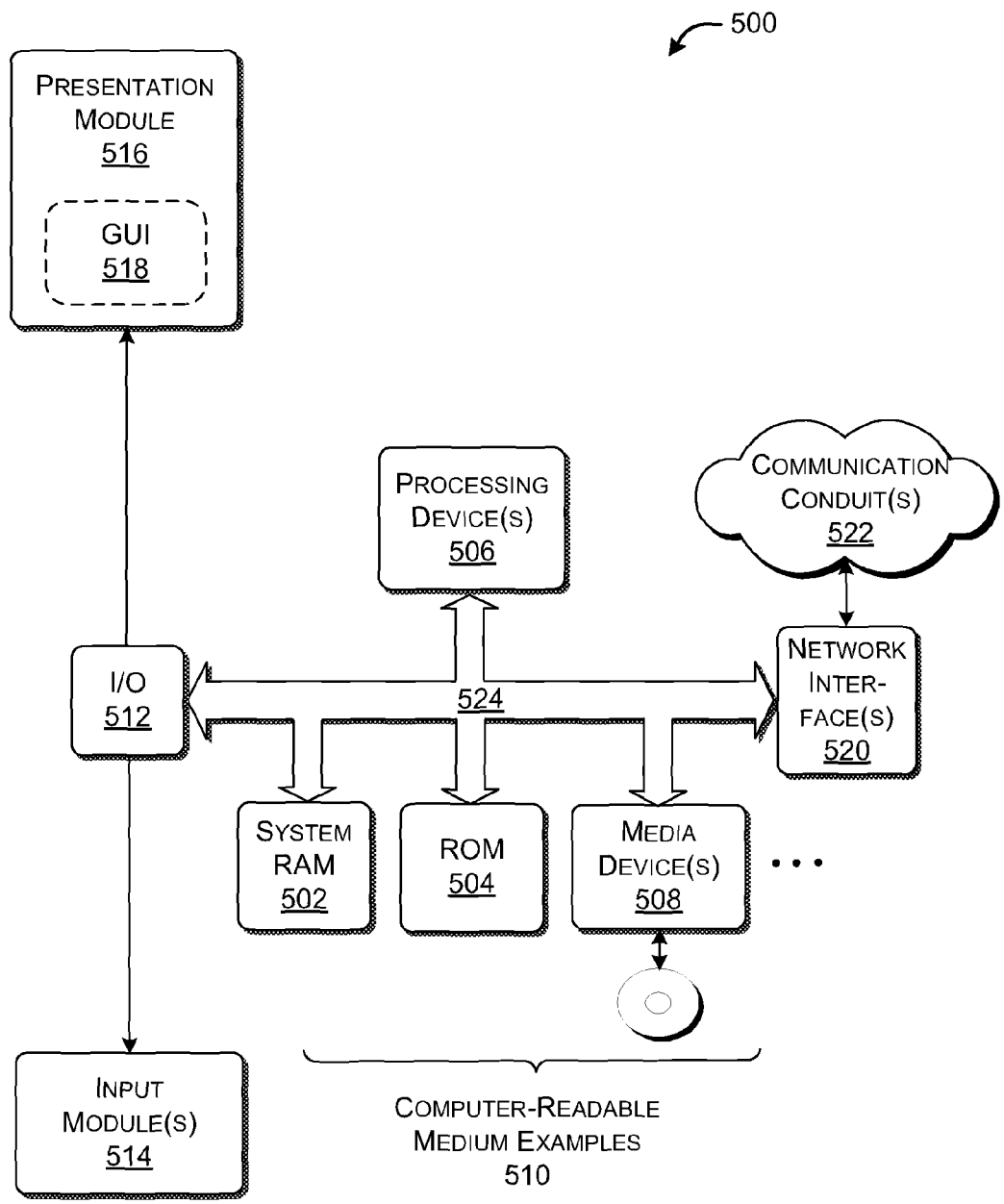
FIG. 5 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 5, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" or the like encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. The term "set" and "sequence" describe collections that may include any number of members, including zero members, one member, or plural members. Finally, the terms "exemplary" or "illustrative" refer to one implementation among potentially many implementations.

A. Illustrative Systems

Figure 1:
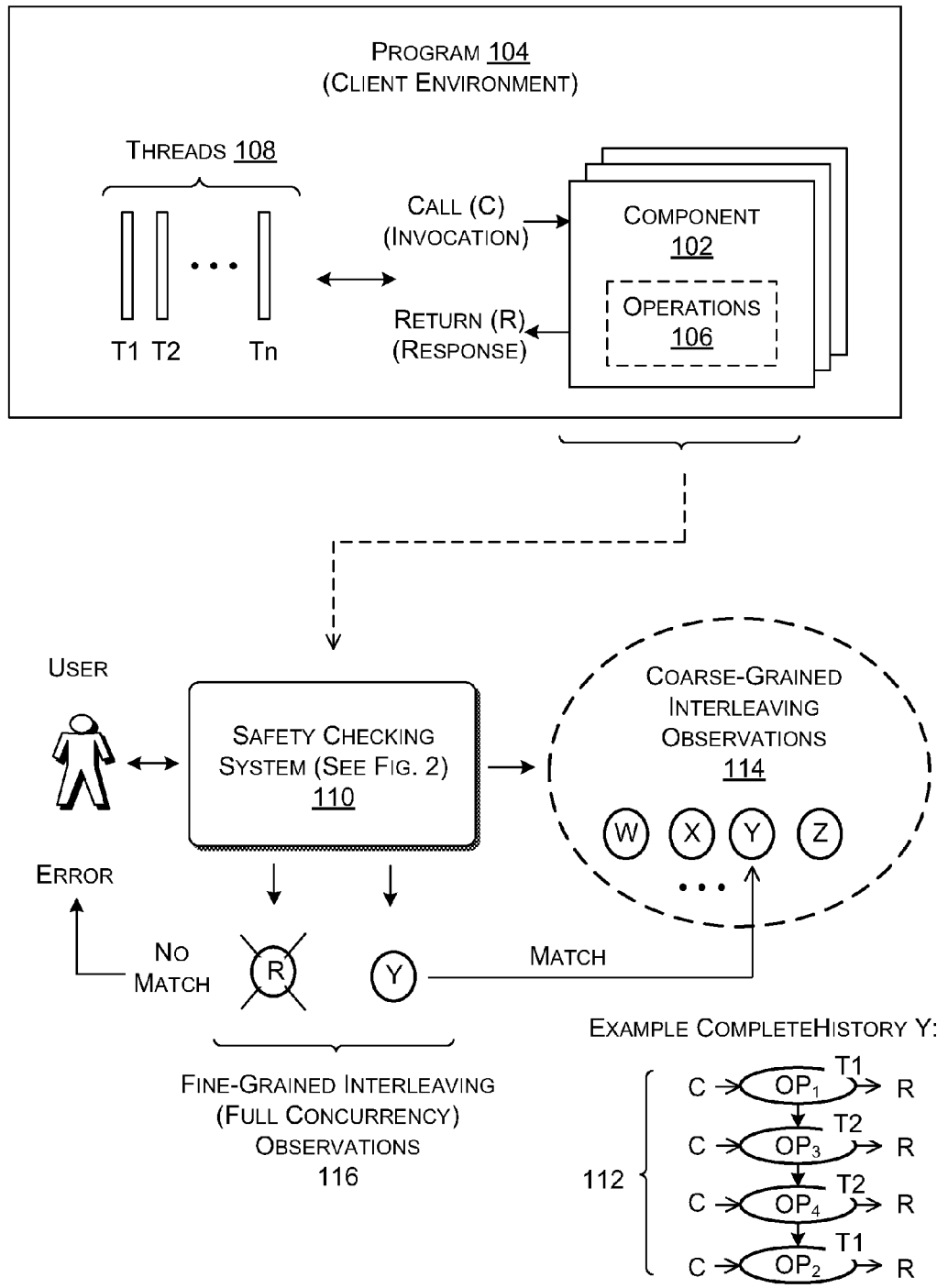
FIG. 1 shows a high-level depiction of a safety checking system and its manner of use.

To first establish context, FIG. 1 shows an illustrative client environment that incorporates a software component 102. Namely, the client environment may correspond to any type of program 104 which relies on the component 102 to perform any type of function. For example, the component 102 may correspond to a class of any type that performs any function. One such component, for example, may operate as a queue. Another component may operate as a set, and so on. In one case, the program 104 incorporates a component that is selected from a more encompassing stock library of such components. In another case, the program 104 may incorporate a component that is custom-developed for use with the program 104. In any case, the component 102 can be said to provide a set of operations 106 that define its behavior. More formally stated, the operations 106 comprise the mechanism that can be used to change the state of the component 102.

In a multi-threaded environment, the program 104 may accommodate two or more threads 108 (T1, T2, . . . Tn) that can interact with the component 102 in a concurrent manner. For example, two or more of the threads 108 can interact with a queue-type component to store entries in the component and retrieve entries from the component. From the "perspective" of the component 102, interaction with any thread involves receiving a call that invokes some operation. The component 102 then generates a return (e.g., a response).

FIG. 1 shows a safety checking system 110 that can be used to test components of the type described above which operate in a multi-threaded environment. More specifically, the safety checking system 110 determines whether one or more components operate in a manner that is considered "thread safe." A developer will typically wish to perform this type of testing to ensure that the component 102 provides correct (non-erroneous) results when incorporated in different applications.

For the purpose of this explanation, a component 102 is considered to be thread safe if its behavior exhibits the property of linearizability. The concept of linearizability, in turn, can be described in different ways. In one description, a component 102 is linearizable if each operation that it performs appears to take effect in an atomic manner at some point between a call (that invokes the operation) and a return (that terminates the operation). This is tantamount to saying that, there appears to be no concurrency within the component 102 itself, although the component 102 may be called in a concurrent manner from the more encompassing standpoint of the program 104. For example, assume that the component 102 receives a request by a first thread to execute an operation. The component 102, if it is possesses the characteristic of linearizability, will appear to execute this operation and provide a return before it begins processing a request from another thread.

FIG. 1 shows an example of a sequence of operations, referred to as a history, which exhibits the characteristic of linearizability. In this sequence: a) thread 1 invokes a first operation ($OP_1$); thread 2 then invokes a third operation ($OP_3$); thread 2 then invokes a fourth operation ($OP_4$); and then thread 1 invokes a second operation ($OP_2$). Each of these operations involves a respective invocation (C) and response (R). Note that, from a coarse or high-level perspective, various interleavings may govern the manner in which the different threads invoke the component 102. In this sense, the program 104 can be said to provide concurrent access to the component 102. But also note that the component 102 appears to handle each task in the order received in an atomic manner, that is, without "mixing" two or more tasks together. More formally stated, a history (H) is serial (linear) if: (1) the sequence of operations (if not empty) starts with a call event; (2) the sequence includes alternating calls and returns; and (3) each return matches an immediately preceding call. In this sense, the component 102 can be said to exhibit no internal concurrency. The qualifier "appears to" means that the component 102 exhibits certain behavior from a high-level input-output point of view; however, the component 102 may achieve this behavior in complex underlying ways that may be describable using other paradigms.

The safety checking system 110 tests thread safety (linearizability) in a four step process. This manner of operation will first be described in overview fashion. The steps include: a) generating one or more tests; b) generating a set of coarse-grained interleaving observations associated with the test (referred to simply as "coarse-grained observations" for brevity); c) generating a set of fine-grained interleaving observations associated with the test (referred to as simply "fine-grained observations" for brevity); and d) determining whether each entry in the set of fine-grained observations is present in the set of coarse-grained observations. Any entry in the fine-grained set of observations that does not have a counterpart entry (a "witness") in the set of coarse-grained set of observations represents a potential linearizability error.

For example, FIG. 1 shows that the safety checking system 110 generates a set of coarse-grained observations 114. These observations are generated based on the assumption that the component 102 possesses the characteristic of linearizability. In other words, these observations are generated based on the assumption that the component 102 exhibits no internal concurrency when handling the requests of various threads. Hence, the set of coarse-grained observations can be considered as a master specification (with respect to particular test) which defines different interleaving permutations that are considered a-priori proper.

FIG. 1 generally represents entries in a small representative sample of coarse-grained observations by the symbols W, X, Y, and Z (merely for explanation purposes). Each observation comprises a sequence (or history) of different operations. For example, the representative history 112, described above, represents one such entry in the set of observations. The safety checking system 110 can form an observation (either coarse-grained or fine-grained) based on any data that indicates the sequence of operations that has been performed; without limitation, in one environment, an observation can be formed based on input data (e.g., arguments for methods), output data (e.g., return values), arguments passed by reference, and non-standard control flow information (e.g., exceptions), etc.

More specifically, there are two possible types of histories. A "complete" history describes a series of operations in which each call includes a counterpart response. On the other hand, a "stuck" history describes a series of operation in which at least one call does not have a counterpart response. For example, consider a queue that accommodates the storage of only one data item. Further assume that this queue is designed to store a new data item only when an existing data item is removed from the queue. Hence, if a thread performs a request to add a data item to a queue that already stores a data item, that request will be "hung up" or blocked until some other thread removes the data item from the queue. And if a test does not exercise an unblocking action, then the history will provide a series of operations that includes a request without a counterpart return. This describes the proper (non-erroneous) behavior of this component.

Next, FIG. 1 shows that the safety checking system 110 generates a set of fine-grained observations 116. These fine-grained observations 116 are generated based on the assumption that the component 102 exhibits no constraints on the type of concurrency that it may exhibit. In other words, the safety checking system 110 makes no assumption about whether or not the component 102 exhibits internal concurrency. In this sense, the safety checking system 110 attempts to simulate whatever behavior the component 102 will exhibit when used in the field, e.g., within an actual program 104.

FIG. 1 generally represents entries in the set of fine-grained observations 116 by the symbols R and Y (merely for explanation purposes). Once again, the entries in the set of fine-grained observations correspond to respective histories. And each history comprises a series of operations. Further, any of entries in the set of fine-grained observations may correspond to a complete history or a stuck history.

In this case, the safety checking system 110 concludes that fine-grained observation Y has a counterpart in the set of coarse-grained observations 114. However, the safety checking system 110 concludes that the fine-grained observation R has no counterpart (or "witness") in the set of coarse-grained observations 114. Hence, the safety checking system 110 determines that entry R is a departure from the standard of linearizability, as defined above.

The observation R may or may not represent an actual error. In one case, the observation R indeed represents a "bug" in the design of the component 102. There was no intent on the developer's part that the component 102 behave in this manner. In another case, the developer may have purposely designed the component 102 to operate in a manner that departs from the definition of linearizability, or may be indifferent to whether the component 102 operates in this manner.

Generally, the following conclusions can be drawn from the output of the safety checking system 110. First, it can be said that a departure from linearizability detected by the safety checking system 110 does indeed represent non-sequential behavior. There are no false positives. However, the failure to detect any non-linearizability errors may not prove that the component 102 is entirely thread safe. For example, the safety checking system 110 may be operating on a suite of tests that fails to uncover the error. Or there may be software "bugs" in the code which manifest themselves in both the generation of the coarse-grained observations and the fine-grained observations.

Figure 2:
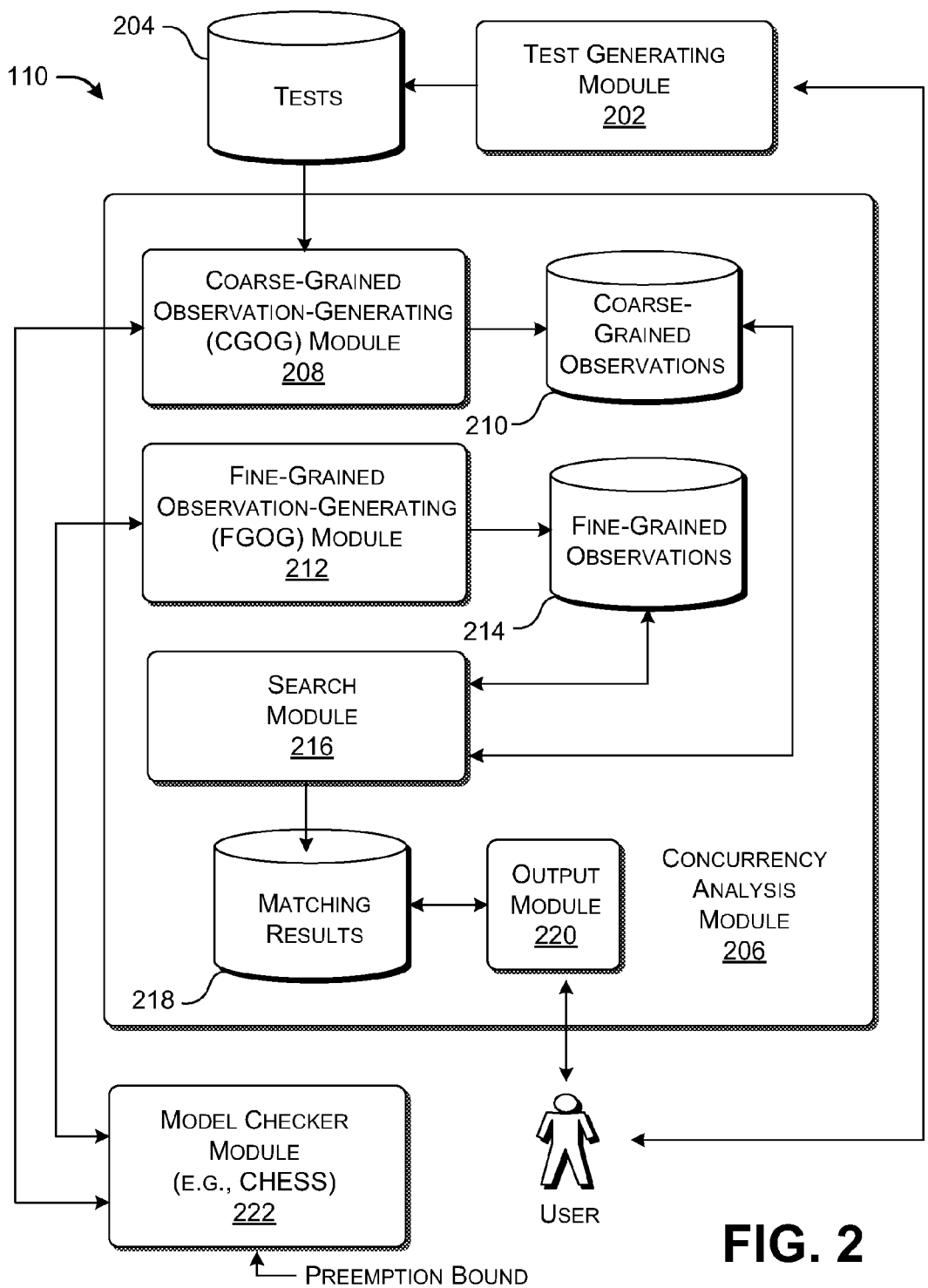
FIG. 2 shows one implementation of the safety checking system of FIG. 1.

With the above introduction, the explanation now advances to FIG. 2. This figure shows a more detailed view of one illustrative implementation of the safety checking system 110.

To begin with, the safety checking system 110 can include a test generating module 202 for generating one or more tests. Each test generally defines a series of operations to be applied to the component 102 by two or more threads. Without limitation, in one form, a test can be formulated as an n×m matrix. Each column in the matrix corresponds to an associated thread. The rows in the matrix correspond to different operations performed by the threads. For example, without limitation, the test generating module 202 can be used to generate 2×2 tests (involving two threads having two operations each) or 3×3 tests (involving three threads having three operations each), and so on.

The test generating module 202 can use any technique to generate the tests. In one approach, the test generating module 202 comprises a text editor or the like which allows a user to create a test in a fully manual manner. That is, the user can draw on his or her experience in designing tests to provide a suite of appropriate tests for a particular testing task at hand. In another approach, the test generating module 202 can provide an engine which generates a suite of tests in a fully automatic manner. For example, the test generating module 202 can generate tests that randomly select operations and randomly allocate the operations to different threads.

In another case, the test generating module 202 can use a semi-automated approach to generate the tests. For example, the user can supply setup information which governs or constraints a random selection technique. The setup information can include: a list of representative invocations to be included in the tests; the desired dimension(s) of each test (e.g., by specifying the n×m test matrix size); and a sample size k that defines a number of tests to be generated. Whatever approach is taken, the test generating module 202 can store the tests it has generated in a data store 204.

A concurrency analysis module 206 successively operates on tests stored in the data store 204. The ultimate aim of the concurrency analysis module 206 is to determine whether the component 102 under test is thread safe. In the context of this explanation, this means that the component 102 exhibits the characteristics of linearizability, as described above.

The concurrency analysis module 206 includes a coarse-grained observation-generating (CGOG) module 208. The CGOG module 208 generates a set of coarse-grained observations, which it stores in a data store 210. As described above, the CGOG module 208 generates these observations under the assumption that there is no concurrency within the component 102 itself. The set of coarse grained observations may include a subset of complete histories and a subset of stuck or blocked histories.

The concurrency analysis module 206 also includes a fine-grained observation-generating (FGOG) module 212. The FGOG module 212 generates a set of fine-grained observations, which it stores in a data store 214. As described above, the FGOG module 212 generates these observations under the condition of full concurrency, e.g., in which no a-priori assumption is made that there is no concurrency within the component 102. The set of fine-grained observations may include a subset of complete histories and a subset of stuck or blocked histories.

A search module 216 examines the entries in the set of fine-grained observations and determines whether they have counterparts in the set of coarse-grained observations. It stores the results of its matching analysis in a data store 218. An output module 220 provides any type of interface which allows the user to inspect the matching results. For example, the output module 220 can provide a graphical user interface or the like which displays at least the non-matching results. These non-matching results represent deviations from the characteristic of linearizability. These results may correspond to errors in the component 102.

The CGOG module 208 and the FGOG module 212 generally operate by exploring different interleaving possibilities. Each interleaving possibility defines a sequence of invocations applied to the operation component 102, together with a manner in which the component 102 responds to these invocations. To explore these permutations, the CGOG module 208 and the FGOG module 212 may utilize the functionality of a model checker module 222. Microsoft Corporation® of Redmond, Wash. provides one such model checker module by the name of CHESS, as described, for instance in M. Musuvathi, et al., "Finding and Reproducing Heisenbugs in Concurrent Programs," *Operating Systems Design and Implementation* (OSDI), 2008, pp. 267-280, and M. Musuvathi, et al., "CHESS: A Systematic Testing Tool for Concurrent Software," Technical Report No. MSR-TR-2008-149, Microsoft Corporation, 2007, pp. 1-15. The CHESS tool is a stateless model checker module that explores different thread interleaving permutations. The CHESS tool can manage the complexity of its exploration task by bounding the number of its preemptions. A preemption refers to an event which interrupts the manner in which a thread executes. While the CHESS tool is an effective interleaving-exploration mechanism, the safety checking system 110 can use other types of tools besides the CHESS tool.

FIG. 3 shows input and output information pertaining to one application of the safety checking system 110. To begin with, the top-most portion of the figure indicates that the safety checking system 110 receives a 2×2 test 302 (in merely one representative case). The component 102 being tested is a queue. The test 302 specifies two operations to be performed by each of two threads, e.g., thread A and thread B. The operation "Add" adds a data item (e.g., 200 or 400) to the queue. The "TryTake" operation removes and returns an oldest element or fails if the queue is empty. The "Take" operation removes and returns the oldest element or blocks if the queue is empty.

The middle portion of the figure shows a merely representative set of coarse-grained observations 304. In one example, the safety checking system 110 forms the coarse-grained observations 304 in an observation file, expressed in a markup language formation (e.g., XML), or any other format. Different elements in the observation file identify different fields of information within the file.

The safety checking system 110 can organize the observations in this set in any manner. In one merely illustrative approach, the safety checking system 110 groups the observations into one or more observation sections. Each observation section defines the same collection of operations applied by the threads. For example, a first observation section 306 includes two thread elements 308. These thread elements specify that thread A performs operations 1 and 2, and thread B performs operations 3 and 4. An operation-definition section 310 describes the nature of operations 1, 2, 3, and 4.

A history section 312 defines one or more histories. The histories may include both complete histories and stuck histories. Here, there is only one history. In one approach, each history can be expressed in the form i [ ] i, where the first i (before the brackets) refers to a call associated with operation i, and the second i (after the brackets) refers to the return of the operation i. For example, the sole history in the history section 312 identifies a sequence of operations that corresponds to the history 112 of FIG. 1. Namely, operation 1 (invoked by thread A) is followed by operation 3 (invoked by thread B). Then, operation 4 (invoked by thread B) is followed by operation 2 (invoked by thread A). Linearizability applies to these operations in the sense that each operation is bracketed by its own respective call and return. In other words, for instance, no intervening task interrupts the component 102 from the time it receives the invocation of an operation until the time that it generates its return (or at least so it seems from a high-level input-output perspective).

Note that the first observation section 306 includes a single history, but the next observation section includes plural histories. The last observation section includes an example of a stuck history, which is represented by a truncated bracket followed by a period ".".

The bottom portion of the figure shows a merely representative set of fine-grained observations 314. More specifically, in this example, the safety checking system 110 displays just the entries in the set of fine-grained observations that have no counterparts in the set of coarse-grained observations. Here, there is just one unmatched entry (corresponding to a single history). The safety checking system 110 can adopt other presentation approaches. For example, the safety checking system 110 can also present some or all of the matching fine-grained observations; in doing so, it can highlight the unmatched observations in any way. Further, the safety checking system 110 can provide explanatory narratives or other guidance to help the user interpret the results. As shown, the fine-grained observations 314 can be organized in the same manner as the coarse-grained observations 304, e.g., by including sections that organize different fields of information.

More specifically, in the example of FIG. 3, the fine-grained observations 314 identify a set of operations which matches a corresponding set of operations in the first observation section 306 of the coarse-grained observations 304. Yet the sole history associated with the fine-grained observations 314 does not match the history in the first observation section 306. Accordingly, the history in the fine-grained observations 314 has no counterpart in the coarse-grained observations 304. The safety checking system 110 accordingly flags this entry as a deviation from the principles of linearizability. This deviation may or may not represent an actual error, depending, in part, on the original intent of the developer of the component 102.

As a general feature, note that the organization of information within the observation file facilitates matching fine-grained entries with coarse-grained entries. For example, the safety checking system 110 can perform matching in a hierarchical manner by first advancing to an observation section (in the coarse-grained observations 304) which matches a like pattern in the fine-grained observations 314. The safety checking system 110 can then search that observation section to determining whether it contains a matching history. This is one search strategy, but other strategies can be used as well.

B. Illustrative Processes

Figure 4:
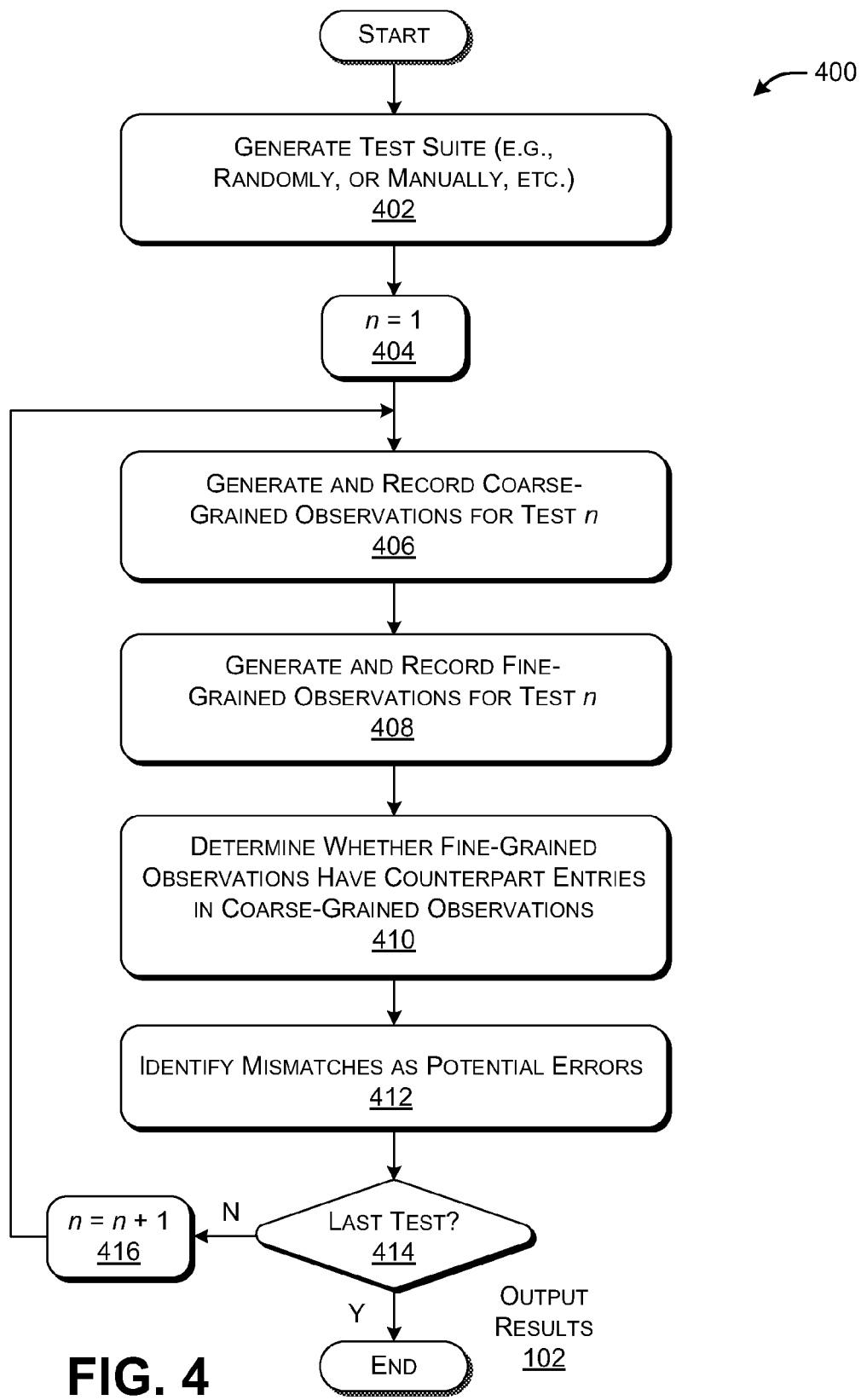
FIG. 4 is a flowchart that shows one manner of operation of the safety checking system of FIG. 1.

FIG. 4 shows a procedure 400 that depicts one manner of operation of the safety checking system 110 of FIG. 1 in flowchart form. Since the principles underlying the operation of the safety checking system 110 have already been described in Section A, certain operations will be addressed in summary fashion in this section.

In block 402, the safety checking system 1110 generates one or more tests, together comprising a test suite. The safety-checking system 110 can use any technique to generate the tests, including a manual technique, an automated technique (e.g., a random-generation technique), or a semi-automated technique.

In block 404, the safety checking system 110 begins by processing the first test (e.g., n=1). In block 406, the safety checking system 110 generates a set of coarse-grained observations for the test (with the linearization constraint enabled). In block 408, the safety checking system 110 generates a set of fine-grained observations (with the linearization constraint disabled). In block 410, the safety checking system 110 determines whether each of the fine-grained observations has counterpart entries in the set of coarse-grained observations. In block 412, the safety checking system 110 identifies mismatches (from block 410) as potential linearizability errors.

In blocks 414 and 416, the safety checking system 110 advances to the next test in the test suite. If there are no more tests to process, the safety checking system 110 can generate an output which provides its results. The results may reveal the unmatched fine-grained observations, which may correspond to concurrency-related errors.

C. Representative Processing Functionality

FIG. 5 sets forth illustrative electrical data processing functionality 500 that can be used to implement any aspect of the functions described above. With reference to FIGS. 1 and 2, for instance, the type of processing functionality 500 shown in FIG. 5 can be used to implement any aspect of the safety checking system 110. In one case, the processing functionality 500 may correspond to any type of computing device that includes one or more processing devices.

The processing functionality 500 can include volatile and non-volatile memory, such as RAM 502 and ROM 504, as well as one or more processing devices 506. The processing functionality 500 also optionally includes various media devices 508, such as a hard disk module, an optical disk module, and so forth. The processing functionality 500 can perform various operations identified above when the processing device(s) 506 executes instructions that are maintained by memory (e.g., RAM 502, ROM 504, or elsewhere). More generally, instructions and other information can be stored on any computer readable medium 510, including, but not limited to, static memory storage devices, magnetic storage devices, optical storage devices, and so on. The term computer readable medium also encompasses plural storage devices.

The processing functionality 500 also includes an input/output module 512 for receiving various inputs from a user (via input modules 514), and for providing various outputs to the user (via output modules). One particular output mechanism may include a presentation module 516 and an associated graphical user interface (GUI) 518. The processing functionality 500 can also include one or more network interfaces 520 for exchanging data with other devices via one or more communication conduits 522. One or more communication buses 524 communicatively couple the above-described components together.

In closing, the description may have described various concepts in the context of illustrative challenges or problems. This manner of explication does not constitute an admission that others have appreciated and/or articulated the challenges or problems in the manner specified herein.

Further, the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for testing a component for thread safety, comprising:
    providing a test that identifies operations performed by two or more threads, the operations being a call and a response to interact with the component to be tested; and
    using a computer-implemented safety checking system for:
        generating and recording a set of coarse-grained observations for the test, each coarse-grained observation being generated based on an assumption that there is no concurrency within the component as the component interacts with said two or more threads;
        generating and recording a set of fine-grained observations for the test, each fine-grained observation being generated based on an assumption that there can be concurrency within the component; and
        determining whether each of the fine-grained observations has a counterpart entry in the set of coarse-grained observations, and identifying each fine-grained observation that does not have a counterpart entry as a potential linearizability error in the component.

2. The method of claim 1, wherein said providing of the test comprises manually providing the test.

3. The method of claim 1, wherein said providing of the test comprises providing the test using a random test-generation technique.

4. The method of claim 1, wherein said providing of the test comprises providing a plurality of tests that form a test suite.

5. The method of claim 4, wherein said providing comprises automatically generating the tests in the test suite, as constrained based on setup information, the setup information including: a list of representative invocations to be included in the tests; a desired n×m dimension of the tests; and a sample size that defines a number of tests to be generated.

6. The method of claim 1, wherein each observation in the set of coarse-grained observations comprises a history that includes a sequence of operations, each operation being associated with a respective call and return.

7. The method of claim 6, wherein at least one observation in the set of coarse-grained observations comprises a complete history, the complete history corresponding to a sequence of operations that contains no pending operation that includes a call without a respective return.

8. The method of claim 6, wherein at least one observation in the set of coarse-grained observations comprises a stuck history, the stuck history corresponding to a sequence of operations where at least one operation includes a pending call without a corresponding return.

9. The method of claim 1, wherein said generating and recording of the set of coarse-grained observations comprises using a stateless model checker module to enumerate entries in the set of coarse-grained observations by exploring different coarse-grained interleaving possibilities.

10. The method of claim 1, wherein said generating and recording of the set of fine-grained observations comprises using a stateless model checker module to enumerate entries in the set of fine-grained observations by exploring different fine-grained interleaving possibilities.

11. A safety checking system for testing a component for thread safety, comprising:
a test generating module configured to provide a test that identifies operations performed by two or more threads;
a coarse-grained observation-generation module configured to generate and record a set of coarse-grained observations for the test, each coarse-grained observation being generated based on an assumption that the component exhibits linearizability as the component interacts with said two or more threads;
a data store for storing the set of coarse-grained observations;
a fine-grained observation-generation module configured to generate and record a set of fine-grained observations for the test, each fine-grained observation being generated without constraint as to whether the component exhibits linearizability;
a search module configured to determine whether each of the fine-grained observations has a counterpart entry in the set of coarse-grained observations, and identify each fine-grained observation that does not have a counterpart entry as a potential linearizability error in the component; and
a stateless model checker module for use by the coarse-grained observation-generation module and the fine-grained observation-generation module, configured to enumerate entries in the set of coarse-grained observations and entries in the set of fine-grained observations.

12. The safety checking system of claim 11, wherein the test generating module is configured to provide a plurality of test using a random test-generation technique.

13. A tangible computer readable storage device for storing computer readable instructions, the computer readable instructions providing a safety checking system when executed by one or more processing devices, the computer readable instructions comprising:
coarse-grained observation generating logic configured to generate and record a set of coarse-grained observations for a test performed on a component, each coarse-grained observation being generated based on an assumption that that operations take place atomically within the component as the component interacts with two or more threads;
fine-grained observation-generation logic configured to generate and record a set of fine-grained observations for the test, each fine-grained observation being generated without constraint as to whether operations take place atomically within the component; and
logic configured to determine whether each of the fine-grained observations has a counterpart entry in the set of coarse-grained observations, and to identify each fine-grained observation that does not have a counterpart entry as a potential linearizability error in the component.

14. The tangible computer readable storage device of claim 13, further comprising test generating logic configured to generate the test.

15. The tangible computer readable storage device of claim 14, wherein the test generating logic is configured to generate the test using a random test-generation technique.

16. The tangible computer readable storage device of claim 13, wherein each observation in the set of coarse-grained observations comprises a history that includes a sequence of operations, each operation being associated with a respective call and return.

17. The tangible computer readable storage device of claim 16, wherein at least one observation in the set of coarse-grained observations comprises a complete history, the complete history corresponding to a sequence of observations that contains no pending operation that includes a call without a respective return.

18. The tangible computer readable storage device of claim 16, wherein at least one observation in the set of coarse-grained observations comprises a stuck history, the stuck history corresponding to a sequence of operations where at least one operation includes a pending call without a corresponding return.

19. The tangible computer readable storage device of claim 13, wherein said coarse-grained observation-generating logic is configured to store the set of coarse-grained observations as an observation file, wherein the observation file includes one or more observation sections, each observation section including one or more histories corresponding to an identified set of operations performed by said two or more threads.

20. The tangible computer readable storage device of claim 13, wherein the coarse-grained observation-generation logic and the fine-grained observation-generation logic are operative to use stateless model checker logic to enumerate entries in the set of coarse-grained observations and entries in the set of fine-grained observations.

* * * * *